US008665144B2

(12) United States Patent
Venkatachalam et al.

(10) Patent No.: US 8,665,144 B2
(45) Date of Patent: Mar. 4, 2014

(54) DUAL-POLARIZATION RADAR PROCESSING SYSTEM USING TIME DOMAIN METHOD

(75) Inventors: Chandrasekaran Venkatachalam, Fort Collins, CO (US); Cuong M. Nguyen, Fort Collins, CO (US); Dmitri N. Moisseev, Helsinki (FI)

(73) Assignee: Colorado State University Research Foundation, Fort Collins, CO (US)

( * ) Notice: Subject to any disclaimer, the term of this patent is extended or adjusted under 35 U.S.C. 154(b) by 385 days.

(21) Appl. No.: 12/387,839

(22) Filed: May 7, 2009

(65) Prior Publication Data

US 2009/0295627 A1 Dec. 3, 2009

Related U.S. Application Data

(60) Provisional application No. 61/051,123, filed on May 7, 2008.

(51) Int. Cl.
*G01S 13/95* (2006.01)

(52) U.S. Cl.
USPC .......................................... 342/188; 342/26 R

(58) Field of Classification Search
USPC ......................................................... 342/188
See application file for complete search history.

(56) References Cited

U.S. PATENT DOCUMENTS

| 5,394,155 A * | 2/1995 | Rubin et al. ................ 342/192 |
| 5,500,646 A * | 3/1996 | Zrnic ............................. 342/188 |
| 5,764,182 A * | 6/1998 | Durand ......................... 342/188 |
| 6,061,013 A * | 5/2000 | Sauvageot et al. .......... 342/26 R |
| 6,448,923 B1 * | 9/2002 | Zrnic et al. ................... 342/26 R |
| 6,473,026 B1 * | 10/2002 | Ali-Mehenni et al. ...... 342/26 R |
| 6,690,333 B2 * | 2/2004 | Eiges ............................. 343/757 |
| 6,803,875 B1 * | 10/2004 | Alford et al. ................ 342/26 R |
| 6,859,163 B2 * | 2/2005 | Alford et al. ................ 342/26 D |
| 7,049,997 B2 * | 5/2006 | Alford et al. ................ 342/26 R |
| 7,053,813 B1 | 5/2006 | Hubbert et al. |
| 7,158,071 B2 * | 1/2007 | Testud et al. ............... 342/25 R |
| 7,171,175 B2 * | 1/2007 | Lahti et al. ................... 455/135 |
| 7,355,546 B2 * | 4/2008 | Randall ....................... 342/26 R |
| 7,365,696 B1 * | 4/2008 | Smeltzer ...................... 343/757 |

(Continued)

FOREIGN PATENT DOCUMENTS

| JP | 2005-017082 A | 1/2005 |
| JP | 2005-156276 A | 6/2005 |

OTHER PUBLICATIONS

Zrnic, Dusan S. "Estimation of Spectral Moments for Weather Echoes". IEEE Transactions on Geoscience Electronics. vol. GE-17. No. 4. Oct. 1979. pp. 113-128.*

(Continued)

Primary Examiner — Matthew M Barker
(74) Attorney, Agent, or Firm — Maschoff Brennan

(57) ABSTRACT

Embodiments of the present invention provide for improved estimation of environmental parameters in a dual-polarization radar system. In some embodiments, environmental parameters can be estimated using a linear combination of data received in two orthogonal polarization states. In particular, embodiments of the invention improve ground clutter and noise mitigation in dual polarization radar systems. Moreover, embodiments of the invention also provide for systems to determine the differential reflectivity and/or the magnitude of the co-polar correlation coefficient and the differential phase in a dual polarization radar system.

11 Claims, 12 Drawing Sheets
(3 of 12 Drawing Sheet(s) Filed in Color)

(56) References Cited

U.S. PATENT DOCUMENTS

| | | | |
|---|---|---|---|
| 7,439,899 B2* | 10/2008 | Stagliano et al. | 342/26 R |
| 7,518,544 B2* | 4/2009 | Venkatachalam et al. | 342/59 |
| 7,528,767 B2* | 5/2009 | Walker | 342/174 |
| 7,554,486 B2* | 6/2009 | Walker | 342/174 |
| 7,592,948 B2* | 9/2009 | Walker | 342/174 |
| 7,773,029 B1* | 8/2010 | Bachman | 342/159 |
| 2005/0093734 A1 | 5/2005 | Alford et al. | |
| 2007/0152867 A1 | 7/2007 | Randall | |
| 2007/0273576 A1 | 11/2007 | Struckman et al. | |
| 2009/0033542 A1 | 2/2009 | Venkatachalam et al. | |

OTHER PUBLICATIONS

Wang et al. "Polarization isolation requirements for linear dual-polarization weather Radar in simultaneous transmission mode of operation". IEEE Trans. on Geoscience and Remote Sensing. vol. 44, Issue 8. Aug. 2006 pp. 2019-2028.*

International Application No. PCT/US2009/043180, International Search Report and Written Opinion, 8 pages, Jul. 27, 2009.

Boyer, Eric et al., "Parametric Spectral Moments Estimation for Wind Profiling Radar," IEEE Transactions on Geoscience and Remote Sensing, vol. 41, No. 8, pp. 1859-1868, Aug. 2003.

Nguyen, Cuong M. et al., "A Parametric Time Domain Method for Spectral Moment Estimation and Clutter Mitigation for Weather Radars," Journal of Atmospheric and Oceanic Technology, vol. 25, pp. 83-92, Jan. 2008.

Nguyen, Cuong M. et al., "A Time Domain Clutter Filter for Staggered PRT and Dual-PRF Measurements," IEEE, pp. 3325-3328, 2007.

Nguyen, Cuong M. et al., "Precipitation Spectral Moments Estimation and Clutter Mitigation Using Parametric Time Domain Model," IEEE, pp. 656-659, 2006.

Extended European Search Report of EP 09743688 mailed on Dec. 22, 2011, 7 pages.

* cited by examiner

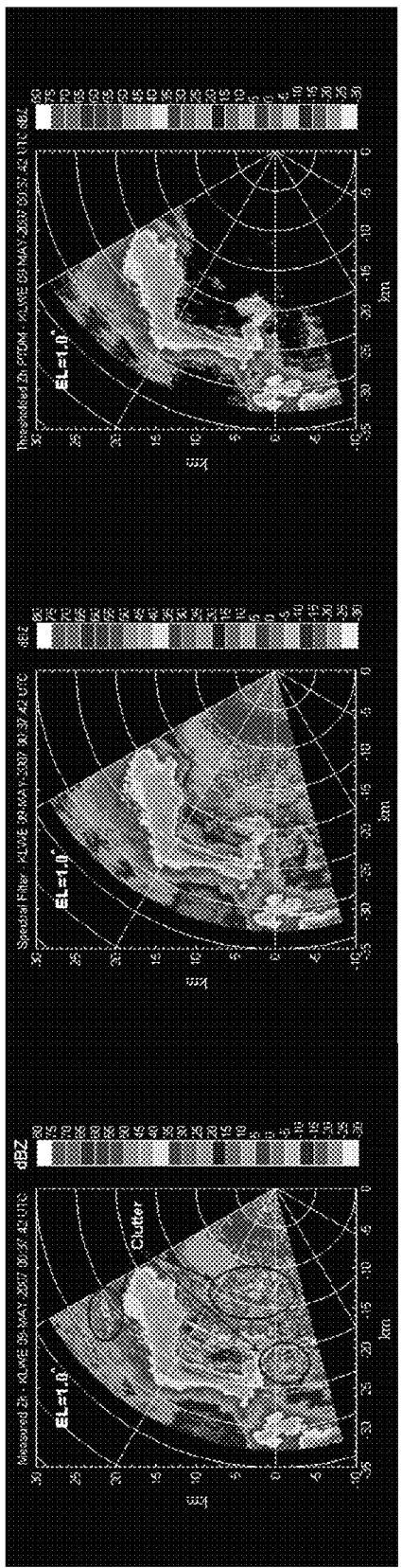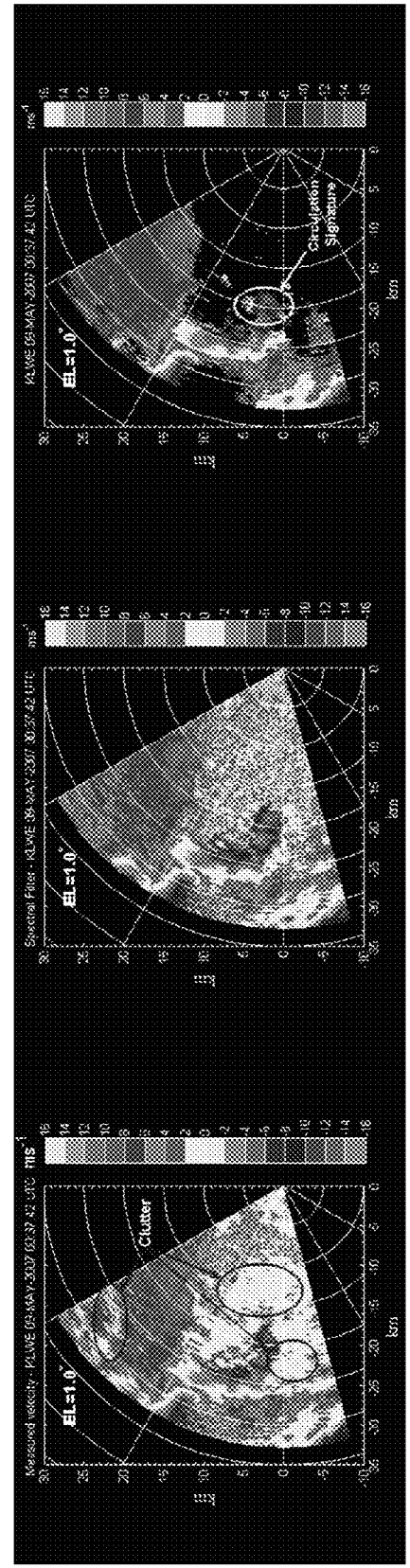
FIG. 9A  FIG. 9B  FIG. 9C  FIG. 9D  FIG. 9E  FIG. 9F

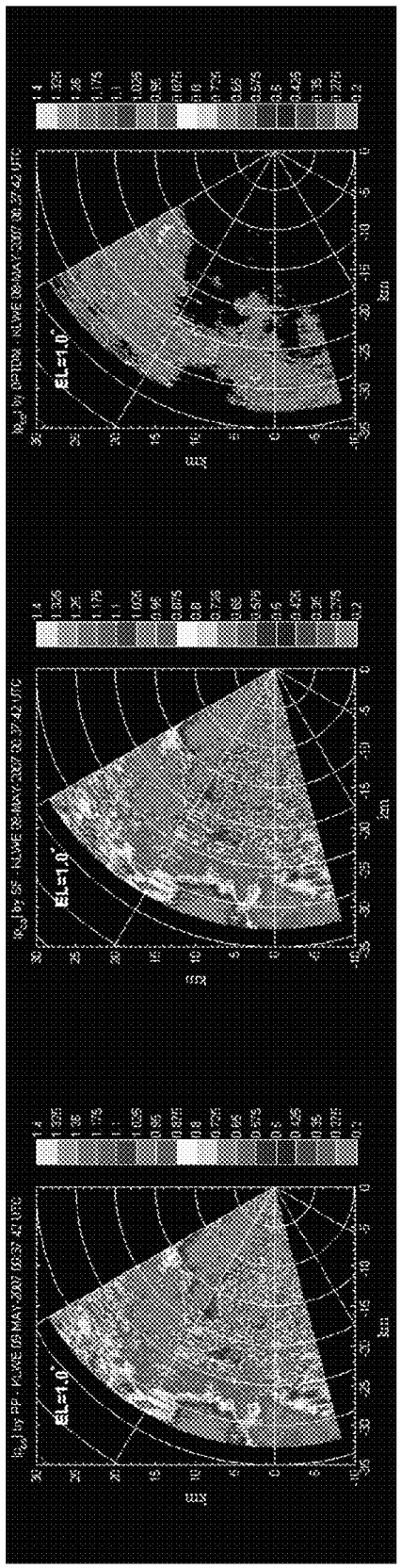
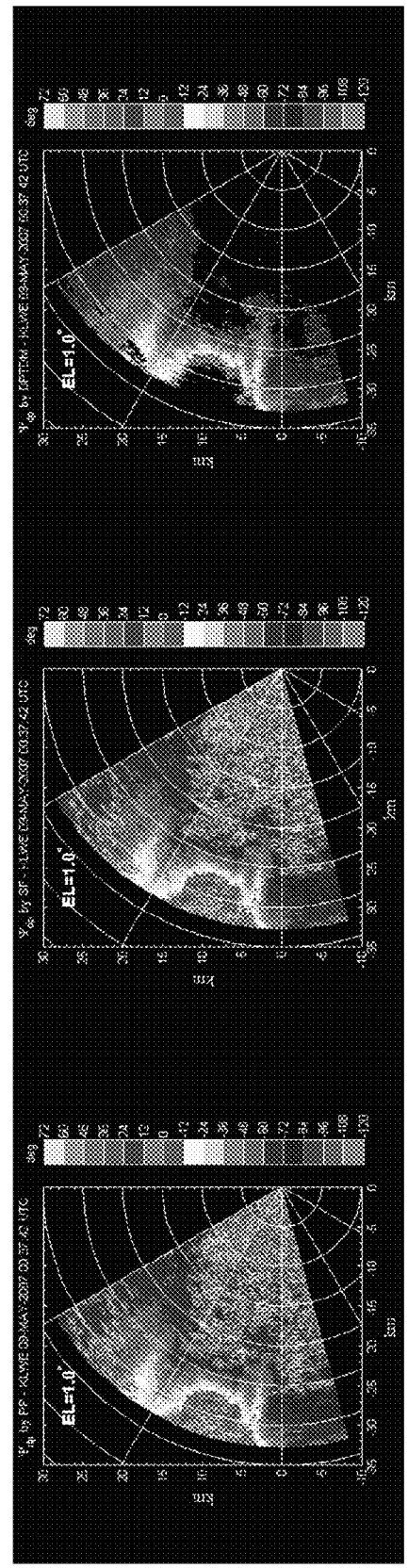
FIG. 10A  FIG. 10B  FIG. 10C  FIG. 10D  FIG. 10E  FIG. 10F

DUAL-POLARIZATION RADAR PROCESSING SYSTEM USING TIME DOMAIN METHOD

CROSS-REFERENCES TO RELATED APPLICATIONS

This application is a non-provisional of, and claims the benefit of, U.S. Provisional Patent Application Ser. No. 61/051,123, entitled "DUAL-POL SYSTEM," filed May 7, 2008, the entire disclosure of which is incorporated herein by reference for all purposes.

FEDERALLY SPONSORED RESEARCH AND DEVELOPMENT

This invention was made with Government support through the National Science Foundation, Grant No. ERC0313747.

BACKGROUND

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist, and which the system 100 attempts to sample, are shown in different positions above the surface 112 of the Earth.

For weather radars, the signal coming from ground targets represents clutter. It is generally desirable to mitigate the contribution of clutter to the overall radar signal to improve the quality of the radar signal and for quantitative applications. Such mitigation is conventionally achieved by applying a notch filter around zero Doppler frequency. The main disadvantage of such an approach is the signal loss, especially in cases where weather echoes have small radial velocities. Recent developments in radar signal processors allow for improvement in clutter suppression. For example, one approach compensates for the effect of notching by using advanced spectral filter that interpolates over notched spectral lines. The limitation of spectral filtering techniques is the effect of spectral leakage, caused by finite sample length, on the spectral moments estimates. As a result, spectral processing limits successful clutter suppression to cases of moderate clutter-to-signal ratios.

BRIEF SUMMARY

Embodiments of the invention make use of a dual-polarization parametric time-domain method ("DPTDM") for mitigating ground clutter and/or noise in radar observations. Such embodiments accordingly provide a method of investigating a region of interest with a dual-polarization radar. A radar signal is propagated into the region of interest in two polarization states and backscatter data is received in the two polarization states. In some embodiments, the two polarization states are orthogonal. The spectral moments of the time series data can be calculated for each of the two polarization states. A new time series that linearly combines the data in the two polarization states can be constructed. In some embodiments, the linear combination of the data in the two polarization states can be a complex value. The magnitude and phase of the co-polar correlation coefficient can then be determined by maximizing the likelihood function of the linear combination time series.

In some embodiments, the linear combination of the data in the two polarization states can be written as $V_\alpha = V^h + \alpha V^v$ and the likelihood function can be written as:

$$L_\alpha = \ln(|(R_{cN}) + xR_p^h|) + tr\left(((R_{cN}) + xR_p^h)^{-1} \hat{R}_{V_\alpha}\right) \qquad (1)$$

where $R_{cN} = R_c^h + R_N^h + |\alpha|^2(R_c^v + R_N^v)$ Extremum of the likelihood function can be determined by solving the differential of $L_\alpha$ with respect to x. In some embodiments, the real and imaginary parts of the co-polar correlation coefficient can be determined from $$x = 1 + \frac{\alpha^2}{\hat{Z}_{dr}} + \frac{2\alpha \mathrm{Re}(\rho_{co})}{\sqrt{\hat{Z}_{dr}}}, \text{ where } \alpha \text{ is real and} \qquad (2)$$

$$x = 1 + \frac{\beta^2}{\hat{Z}_{dr}} - \frac{2\beta \mathrm{Im}(\rho_{co})}{\sqrt{\hat{Z}_{dr}}}, \text{ where } \alpha = j\beta \qquad (3)$$

In some embodiments, the initial values of $\alpha$ and $\beta$ can be set to $\pm 1$, and subsequent values of $\alpha$ and $\beta$ can be determined from $$\alpha^n = \frac{(\hat{Z}_{dr}^n - 1) + \sqrt{(\hat{Z}_{dr}^n - 1)^2 + 4\mathrm{Re}(\hat{\rho}_{co}^{(n-1)})\hat{Z}_{dr}^n}}{2\mathrm{Re}(\hat{\rho}_{co}^{(n-1)})\sqrt{\hat{Z}_{dr}^{(n)}}} \qquad (4)$$

$$\beta^n = \frac{(\hat{Z}_{dr}^n - 1) + \sqrt{(\hat{Z}_{dr}^n - 1)^2 + 4\mathrm{Im}(\hat{\rho}_{co}^n)\hat{Z}_{dr}^n}}{2\mathrm{Im}(\hat{\rho}_{co}^{(n-1)})\sqrt{\hat{Z}_{dr}^n}}$$

Thus, various embodiments of the invention provide for the determination of environmental factors using a linear combination of radar data received in orthogonally polarized states. In particular, ground clutter and noise mitigation can be increased using embodiments described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A-9C show a comparison of reflectivity over a region of interest using pulse pair processing (9A), spectral filtering (9B), and dual-polarization parametric time domain method as described throughout this disclosure (9C).

FIGS. 9D-9F show a comparison of velocity measurements over a region of interest using pulse pair processing (9D), spectral filtering (9E), and dual-polarization parametric time domain method as described throughout this disclosure (9F).

FIGS. 10A-10C show a comparison of differential propagation phase ($\Phi_{dp}$) measurements over a region of interest using pulse pair processing (10A), spectral filtering (10B), and dual-polarization parametric time domain method as described throughout this disclosure (10C).

FIGS. 10D-10F show a comparison of co-polar correlation coefficient ($\rho_{co}$) measurements over a region of interest using pulse pair processing (10D), spectral filtering (10E), and dual-polarization parametric time domain method as described throughout this disclosure (10F).

DETAILED DESCRIPTION

Some embodiments of the invention provide a system for determining environmental parameters within a region of interest using a dual polarization parametric time domain method. Previous work has provided parametric time domain methods (PTDM) that can estimate various parameters in single-polarization and/or dual-polarization radar data. Such methods and/or systems are described in U.S. patent application Ser. No. 11/83,0574, titled "Ground Clutter Mitigation Using a Parametric Time Domain Method," filed Jul. 30, 2007, the entire disclosure of which is incorporated by reference for all purposes. PTDM provides a good model for clutter, precipitation and noise in the received radar data for each polarization. However, PTDM does not consider any correlation between the polarized data. Some embodiments of the invention provide a model and estimator to explore the correlation between the two polarization channels.

Figure 1:
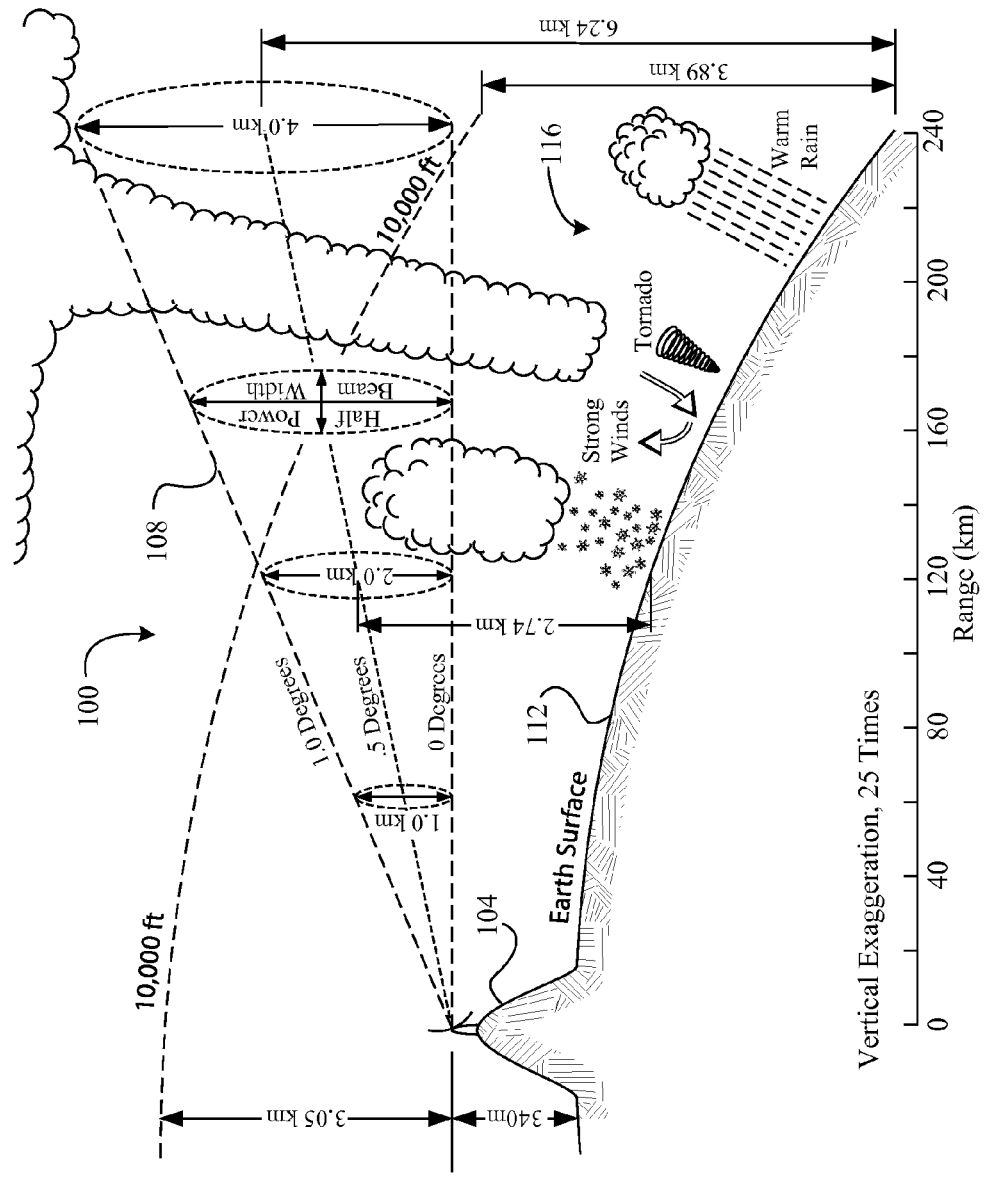
FIG. 1 provides a schematic illustration of the operation of a conventional radar system (reproduced from the National Academy of Sciences Report, "Flash flood forecasting over complex terrain").
Figure 2:
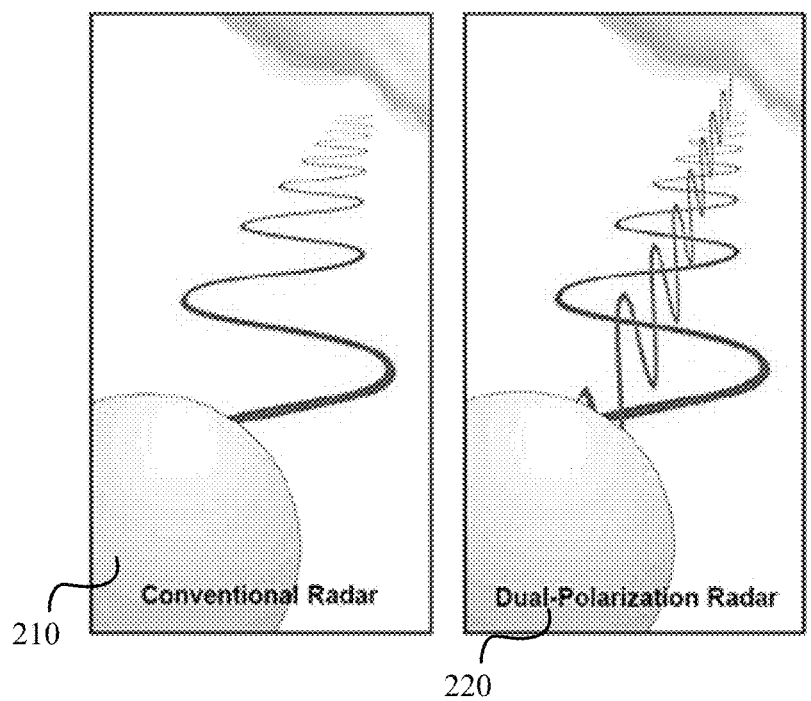
FIG. 2 shows an illustration of a conventional radar system compared with a dual-polarization radar system.

FIG. 2 shows an illustration of a conventional radar system 210 with a single polarization state compared with a dual-polarization radar system 220 (or polarimetric radar system). Dual-polarization radar systems 220 can transmit and receive two orthogonal polarization states, often at vertical polarization and horizontal polarization as shown in the figure. Dual-polarization radar systems can provide many important parameters for meteorologists including differential reflectivity, co-polar correlation coefficients, linear depolarization ratio and/or specific differential phase.

Figure 3A:
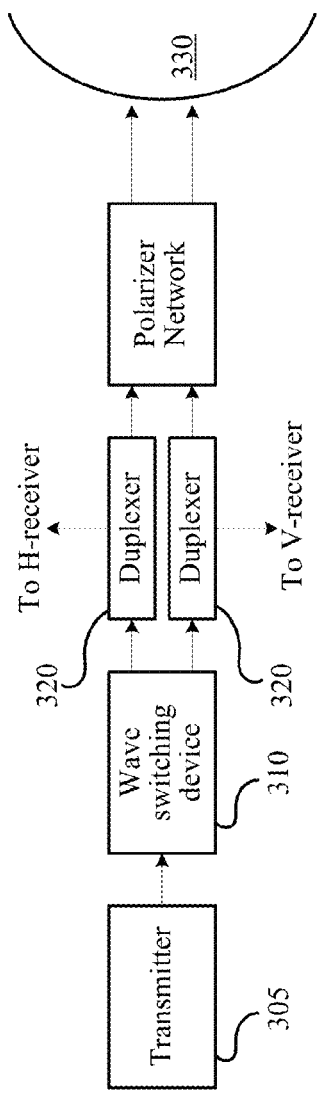
FIG. 3 shows a simplified block diagram of the transmission side of a dual-polarization radar system according to some embodiments.

FIG. 3A shows a simplified block diagram 300 of the transmission side of a dual-polarization radar system according to some embodiments. Such a transmitter can change the polarization state between any two orthogonal polarization states on a pulse-to-pulse basis. Transmitter 305 can produce and/or send signals and/or waveforms to waveguide switching device 310. Wave switching device 310 can be a high power waveguide switch. Wave switching device 310 can switch between transmission from transmitter 305 to duplexer 320 based on the desired polarization of waveform. Wave switching device 310, for example, can include a mechanical motor-driven rotary vane switch and/or an electronically controlled ferrite circulator switch.

Duplexer 320 can isolate the received signals from the transmitter waveform. As noted, received signals can be sent to the proper polarization receiver. Microwave polarizer network 325 can include a variable ratio power dived and/or variable phase shifter which can be used to synthesize the proper input waveform to antenna 330.

Figure 3B:
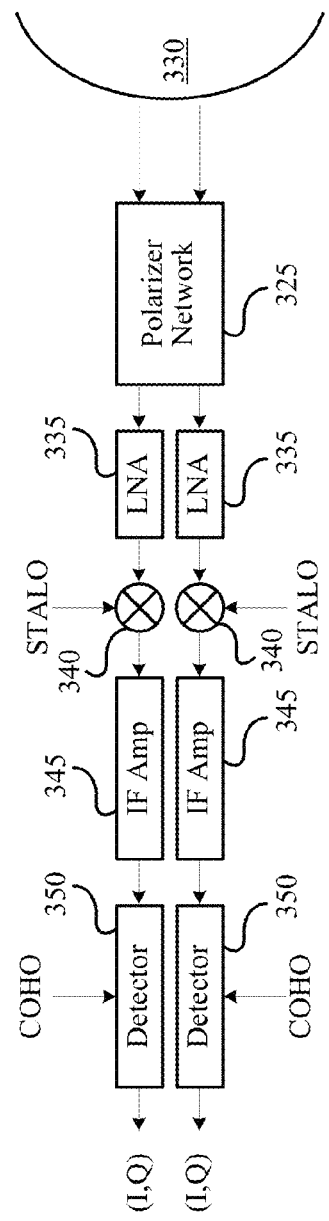

FIG. 3B shows a simplified block diagram 360 of the receiver side of a dual-polarization radar system according to some embodiments. Such receivers can measure the various terms (both real and imaginary) that are part of the data covariance matrix (the covariance matrix is discussed below). Microwave polarizer network 325 receives the backscatter radar signal from antenna 330 and the received signals are duplexed from the transmitter signals by duplexers 320. Low noise amplifiers 335 can be employed for signal filtering. Mixers 340 for each polarization channel can be employed to mix the received signal with a stable local oscillator (STALO). Intermediate frequencies can be amplified using intermediate frequency amplifiers 345; and the backscatter signal can be detected for both polarizations at detectors 350.

Figure 4:
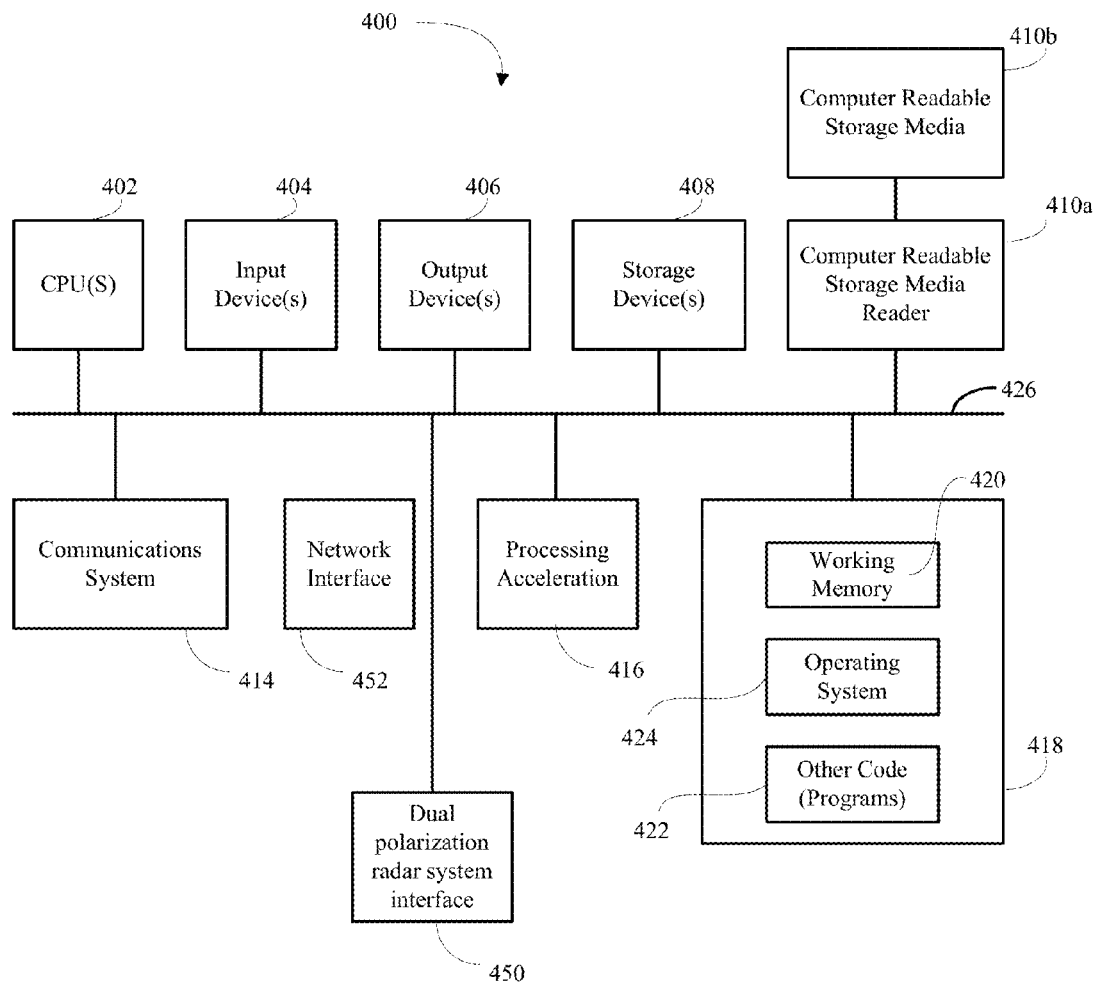
FIG. 4 shows a simplified block diagram of the receiver side of a dual-polarization radar system according to some embodiments.

FIG. 4 shows a block diagram of a computer system 400 that can be coupled with a dual polarization radar system for computation of environmental parameters using various embodiments of the invention. Computer system 400 can be used to perform any or all the computations shown in FIG. 2 and/or FIG. 3. The drawing illustrates how individual system elements can be implemented in a separated or more integrated manner. The computer 400 is shown having hardware elements that are electrically coupled via bus 426. Network interface 452 can communicatively couple the computational device 400 with another computer, for example, through a network such as the Internet. The hardware elements can include a processor 402, an input device 404, an output device 406, a storage device 408, a computer-readable storage media reader 410a, a communications system 414, a processing acceleration unit 416 such as a DSP or special-purpose processor, and memory 418. The computer-readable storage media reader 410a can be further connected to a computer-readable storage medium 410b, the combination comprehensively representing remote, local, fixed, and/or removable storage devices plus storage media for temporarily and/or more permanently containing computer-readable information.

Dual polarization radar system interface 450 is coupled with bus 426. In some embodiments, dual polarization radar system interface 450 can be any type of communication interface. For example, dual polarization radar system interface 450 can be a USB interface, UART interface, serial interface, parallel interface, etc. Dual polarization radar system interface 450 can be configured to couple directly with a dual polarization radar system.

The computer system 400 also comprises software elements, shown as being currently located within working memory 420, including an operating system 424 and other code 422, such as a program designed to implement methods and/or processes described herein. In some embodiments, other code 422 can include software that provides instructions for receiving user input from a dual polarization radar system and manipulating the data according to various embodiments disclosed herein. In some embodiments, other code 422 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

While FIGS. 3A, 3B and 4 are described herein with reference to particular blocks, it is to be understood that the blocks are defined for convenience of description and are not intended to imply a particular physical arrangement of component parts. Further, the blocks need not correspond to physically distinct components.

Figure 5:
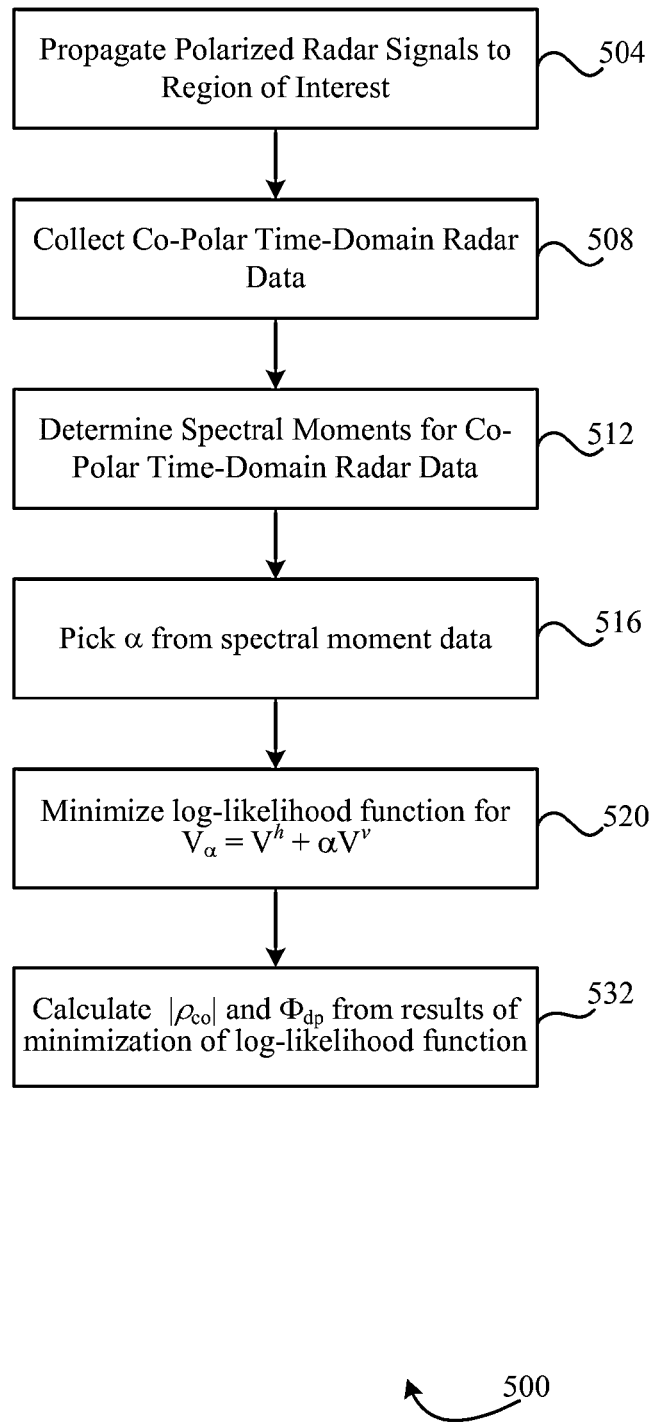
FIG. 5 shows a flowchart of a process for defining the state of a region of interest using dual-polarization radar according to some embodiments.

A general overview of methods of the invention is provided with the flow diagram 500 of FIG. 5. The method 500 begins by propagating dual-polarization radar signals to a region of interest as indicated at block 504. Sampled time series data are collected at block 508 in two polarizations and used in determining dual-polarization parameters for a time-domain parametric model of the region of interest. A specific model is described below but alternative embodiments of the invention may use other dual-polarization parametric models.

At block 512, spectral moments for co-polar time domain data can be estimated. For example, spectral moments can be estimated using PTDM and/or GMAP methods that are known in the art. In some embodiments, the summation of the log-likelihood function for co-polar data can be minimized and solved for die spectral moments. In other embodiments, the summation of the log-likelihood function for co-polar data can be maximized and solved for the spectral moments. In some embodiments, the differential reflectivity can also be estimated from the spectral moments of two polarizations. At block 516, $\alpha$ and $\beta=j\alpha$ can be determined using estimated dual-polarization parameters from previous range gates. At block 520, a log-likelihood function for the linear combination of the two polarization vectors, for example, $V_\alpha = V^h + \alpha V^v$, can be minimized. In other embodiments, a log-likelihood function can be maximized. From this minimization (or maximization) the magnitude and/or the phase of the co-polar correlation coefficient can be determined at block 532.

Figure 6:
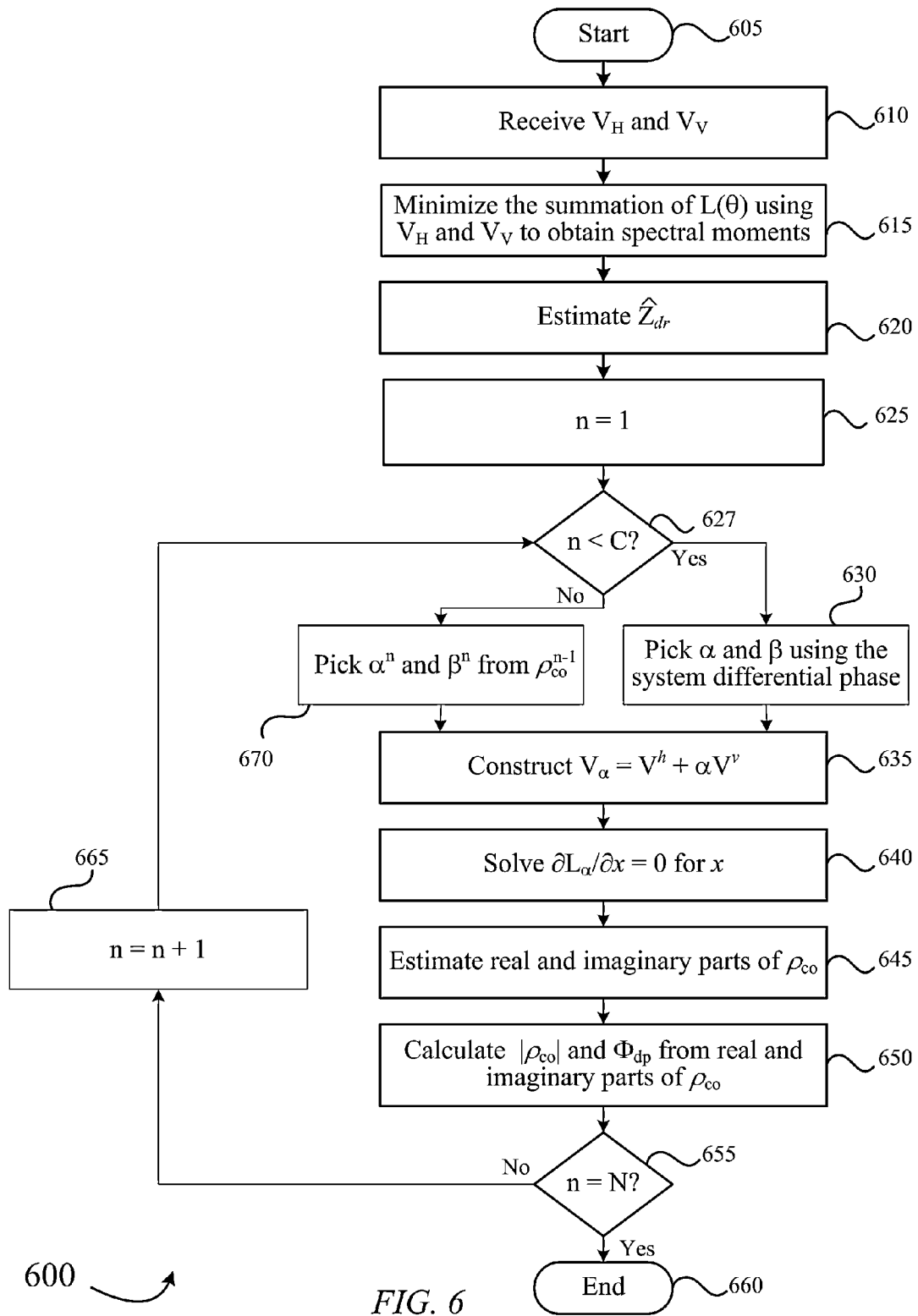
FIG. 6 shows a flowchart for a process for determining the differential reflectivity, the co-polar correlation coefficient ($|\rho_{co}|$) and/or the differential propagation phase ($\Phi_{dp}$) according to some embodiments.

Some embodiments of the invention can estimate the magnitude and the phase of the co-polar correlation coefficient from a linear combination of two polarization radar data. Such estimations, for example, can be performed using computer system 400. FIG. 6 shows a flowchart of such process 600 that can be followed to determine the magnitude of the co-polar correlation coefficient ($\rho_{co}$) and the differential propagation phase ($\Phi_{dp}$), which is the angle of $\rho_{co}$ in the complex plane. Process 600 starts at block 605 and can receive voltage readings from the backscatter of a region of interest for two polarizations at block 610. For example, the voltage readings can include data from vertically polarized and horizontally polarized signals.

At block 615, a summation of the likelihood functions for both $V^H$ and $V^V$ can be minimized to obtain the horizontal and vertical spectral moments. The likelihood function for each polarization (h,v) can be written as $$L(\theta)^{h,v} = \ln(|R(\theta)^{h,v}|) + tr(R^{h,v-1}(\theta)\hat{R}_v^{h,v}), \tag{5}$$

where $R^{h,v}$ is the covariance matrix of measures signal at sampling rate $T_S$ and can be given by $$R^{h,v}[k,l] = P_p^{h,v}\exp\left(-\frac{8\pi^2\sigma_p^{h,v2}(k-l)^2 T_s^2}{\lambda^2}\right)\exp\left(-j\frac{4\pi\bar{v}^{h,v}(k-l)T_s}{\lambda}\right) + P_c^{h,v}\exp\left(-\frac{8\pi^2\sigma_c^{h,v2}(k-l)^2 T_s^2}{\lambda^2}\right) + \sigma_N^{2h,v}\delta(k-l); \tag{6}$$

$$k,l = 1, \ldots, N,$$

and $\hat{R}_V^h = V^h V^{hH}$ is the sample covariance matrix for H signal and $\hat{R}_V^v = V^v V^{vH}$ is the sample covariance matrix for V signal. The spectral moments can be $$\theta = [\sigma_c^h, P_c^h, \sigma_c^v, P_c^v, \bar{v}, \sigma, P_p^h, P_p^v, \sigma_N^{2h}, \sigma_N^{2v}], \tag{7}$$

where $P_p^{h,v}$ is the precipitation signal power, $\sigma_p^{h,v}$ is the precipitation spectrum width, $\bar{v}$ is the mean velocity of precipitation, $P_c^{h,v}$ is the clutter power, $\sigma_c^{h,v}$ is the clutter spectrum width, $\sigma_N^{2h,v}$ is the noise power, and $\lambda$ denotes the radar wavelength; j is $\sqrt{-1}$ and $\delta$ is a Kronecker function.

The precipitation spectral moments for the two polarizations can be obtained by minimizing the log-likelihood function $$\hat{\theta} = \underset{\theta}{\operatorname{argmin}}(L(\theta)). \tag{8}$$

Once the spectral moments have been determined, at block 620, $\hat{Z}_{dr}$ can be determined from $$\hat{Z}_{dr}(dB) = \hat{P}^h(dB) - \hat{P}^v(dB). \tag{9}$$

Figure 8:
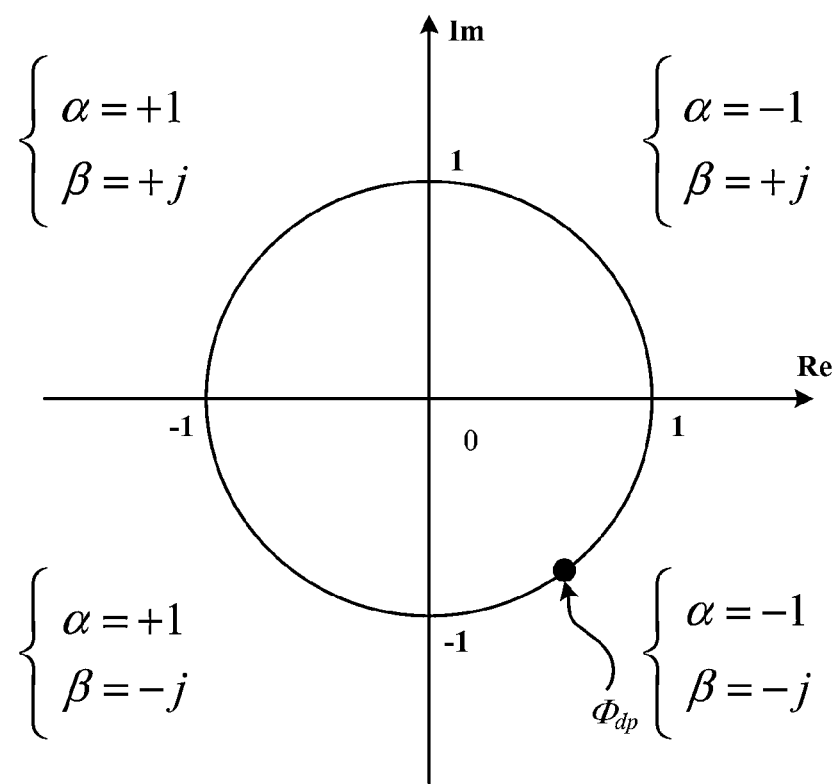
FIG. 8 depicts a correspondence between the location of an estimated differential propagation phase ($\Phi_{dp}$) and the initial choices of $\alpha$.

The counter n is initialized to one starting at the first range bin at block 625. At block 627, it can be determined whether n is less than some predetermined and/or user defined constant C. In some embodiments, C can be 2, 3, 4, 5, 6, 7, 8, 9, 10, etc. If n is less than C, then $\alpha$ and $\beta$ can be determined from the angle of $\Phi_{dp}$ in the complex plane at block 630. The values for the first range bins (bin numbers less than C) of $\alpha$ and $\beta$ can be estimated as being +1 or −1 as shown in FIG. 8. In some embodiments, the angle of $\Phi_{dp}$ for the firsts bins can be estimated using estimation technique. For example, for the first few bins, if $0° < \Phi_{dp} < 90°$, then $\alpha = -1$ and $\beta = 1$. If $90° < \Phi_{dp} < 180°$, then $\alpha = 1$ and $\beta = 1$. If $180° < \Phi_{dp} < 270°$, then $\alpha = 1$ and $\beta = -1$. If $270° < \Phi_{dp} < 360°$, then $\alpha = -1$ and $\beta = -1$. Process 600 can then move on to block 635.

If n is greater than C at block 627, then $\alpha$ and $\alpha = j\beta$ can be estimated using $$\alpha^n = -\frac{(\hat{Z}_{dr}^n - 1) + \sqrt{(\hat{Z}_{dr}^n - 1)^2 + 4\operatorname{Re}(\hat{\rho}_{co}^{(n-1)})\hat{Z}_{dr}^n}}{2\operatorname{Re}(\hat{\rho}_{co}^{(n-1)})\sqrt{\hat{Z}_{dr}^{(n)}}} \tag{10}$$

-continued $$\beta^n = -\frac{(\hat{Z}_{dr}^n - 1) + \sqrt{(\hat{Z}_{dr}^n - 1)^2 + 4\text{Im}(\hat{\rho}_{co}^n)\hat{Z}_{dr}^n}}{2\text{Im}(\hat{\rho}_{co}^{(n-1)})\sqrt{\hat{Z}_{dr}^n}}.$$

In equation 10, $\rho_{co}^{n-1}$ is the co-polar correlation coefficient for the previous range bin.

At block 635, a linear combination of the two polarization vectors can be constructed as $$V_\alpha = V^h + \alpha V^v \qquad (11)$$

where $V^h$ is the sampled voltage data for the horizontally polarized signal and $V^v$ is the sample voltage data for the vertically polarized signal.

A log-likelihood function for dual polarization data can be written as:

$$L_\alpha = \ln(|(R_{cN}) + xR_p^h|) + tr\left(((R_{cN}) + xR_p^h)^{-1} \hat{R}_{V_\alpha}\right), \qquad (1)$$

where $R_c$ is the covariance matrix for clutter, $R_N$ is the covariance matrix for noise, $R_p^h$ is the horizontally polarized covariance matrix for precipitation, $R_p^v$ is the vertically polarized covariance matrix for precipitation, and $\hat{R}_{V_\alpha}$ is the covariance matrix of sampled data for $V_\alpha$.

In some embodiments, $L_\alpha$ can be minimized by setting the derivative of the likelihood function with respect to x to zero:

$$\frac{\partial L_\alpha}{\partial x} = tr\left\{(xR_p^h + R_{cN})^{-1} R_p^h (I - (xR_p^h + R_{cN})^{-1} \hat{R}_{V_\alpha})\right\} = 0, \qquad (13)$$

where $$R_{cN} = R_c^h + R_N^h + |\alpha|^2 (R_c^v + R_N^v). \qquad (14)$$

The results of minimizing the likelihood function $L_\alpha$ can produce values for the real and the imaginary parts of the co-polar correlation coefficient.

At block 645, if $\alpha$ is real, then we can determine the real parts of $\rho_{co}$ from the following, $$x = 1 + \frac{\alpha^2}{\hat{Z}_{dr}} + \frac{2\alpha \text{Re}(\rho_{co})}{\sqrt{\hat{Z}_{dr}}}; \qquad (15)$$

and if $\alpha$ is imaginary, $\alpha = j\beta$ where $\beta$ is real, then we can determine the imaginary part of $\rho_{co}$ from the following, $$x = 1 + \frac{\beta^2}{\hat{Z}_{dr}} - \frac{2\beta \text{Im}(\rho_{co})}{\sqrt{\hat{Z}_{dr}}}. \qquad (16)$$

Using the values for $\alpha$, $\beta$, and estimated value of $Z_{dr}$, and estimated x as determined in blocks 630, 620 and 640, we can solve equations 15 and 16 for the real and imaginary parts of $\rho_{co}$ at block 645. At block 650, the magnitude and angle ($\Phi_{dp}$) of $\rho_{co}$ can be determined from the real and absolute values of $\rho_{co}$ for the $n^{th}$ range bin.

If n equals the number of range gates, N, in the data set, at block 655, then process 600 ends at block 660, where N is the number of range gates. If, however, n is less than the number of range gates, then n can be incremented at block 665 and process 600 returns to block 627.

Figure 7:
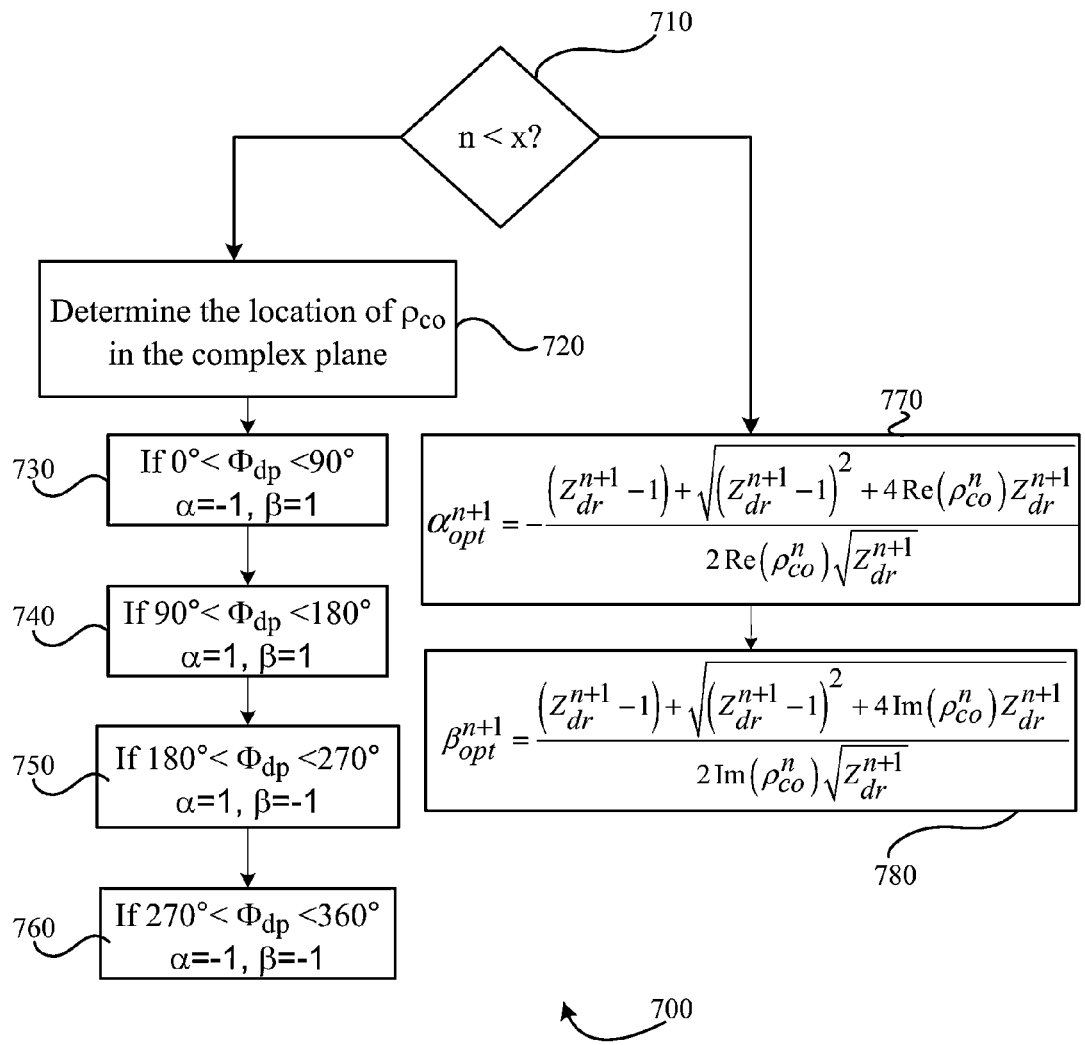
FIG. 7 shows a flowchart for estimating the coefficient in the linear combination data $\alpha$ according to some embodiments.

FIG. 7 shows a method 700 for estimating the optimal values of $\alpha$ and $\beta$ according to some embodiments. At block 710, process 700 determines whether bin number n is less than a preset value x, which, for example, can be less than 10. In some embodiments, x can equal 1, 2, 3, 4, 5, 6, 7, 8, 9, etc. If n is less than x, then we are looking at data in the first few bins, and we can estimate $\rho_{co}$ from the location of $\Phi_{dp}$ in the complex plan at block 720. If $0°<\Phi_{dp}<90°$, then $\alpha=-1$ and $\beta=1$, as shown in block 730. If $90°<\Phi_{dp}<180°$, then $\alpha=1$ and $\beta=1$, as shown in block 740. If $180°<\Phi_{dp}<270°$, then $\alpha=1$ and $\beta=-1$, as shown in block 750. If $270°<\Phi_{dp}<360°$, then $\alpha=-1$ and $\beta=-1$, as shown in block 760. If bin number n is greater than a preset value x, then the optimal values of $\alpha$ and $\beta$ can be determined as shown in blocks 770 and 780.

FIGS. 9A-9C show a comparison of reflectivity over a region of interest using pulse pair processing (9A), spectral filtering (9B), and dual-polarization parametric time domain method as described throughout this disclosure (9C). As can be seen in FIG. 9C, ground clutter and/or noise has been greatly mitigated.

FIGS. 9D-9F show a comparison of velocity measurements over a region of interest using pulse pair processing (9D), spectral filtering (9E), and dual-polarization parametric time domain method as described throughout this disclosure (9F). As can be seen in FIG. 9F, ground clutter and/or noise has been greatly mitigated. Moreover, FIG. 9F shows characteristics of a circular signature indicative of tornadoes and/or hurricanes. This circular signature is difficult (or impossible) to visualize in FIGS. 9D and 9E.

FIGS. 10A-10C show a comparison of co-polar correlation coefficient ($\rho_{co}$) measurements over a region of interest using pulse pair processing (10A), spectral filtering (10B), and dual-polarization parametric time domain method as described throughout this disclosure (10C). As can bee seen in FIG. 10C, by using embodiments of the invention, the ground clutter and/or noise has been mitigated.

FIGS. 10D-10F show a comparison of differential propagation phase ($\Phi_{dp}$) measurements over a region of interest using pulse pair processing (10D), spectral filtering (10E), and dual-polarization parametric time domain method as described throughout this disclosure (10F). Again, as can be seen in FIG. 10F, by using embodiments of the invention, the ground clutter and/or noise has been mitigated.

Figure 11A:
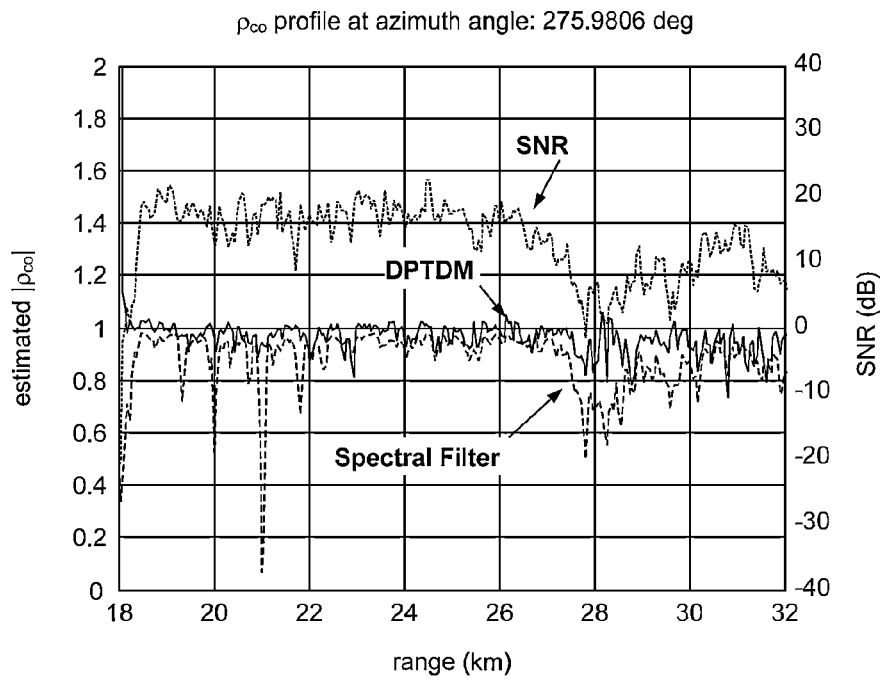
FIGS. 11A and 11B show range profiles for estimated $\rho_{co}$ at azimuth angles 275 degree and 315 degree using embodiments described herein.
Figure 11B:
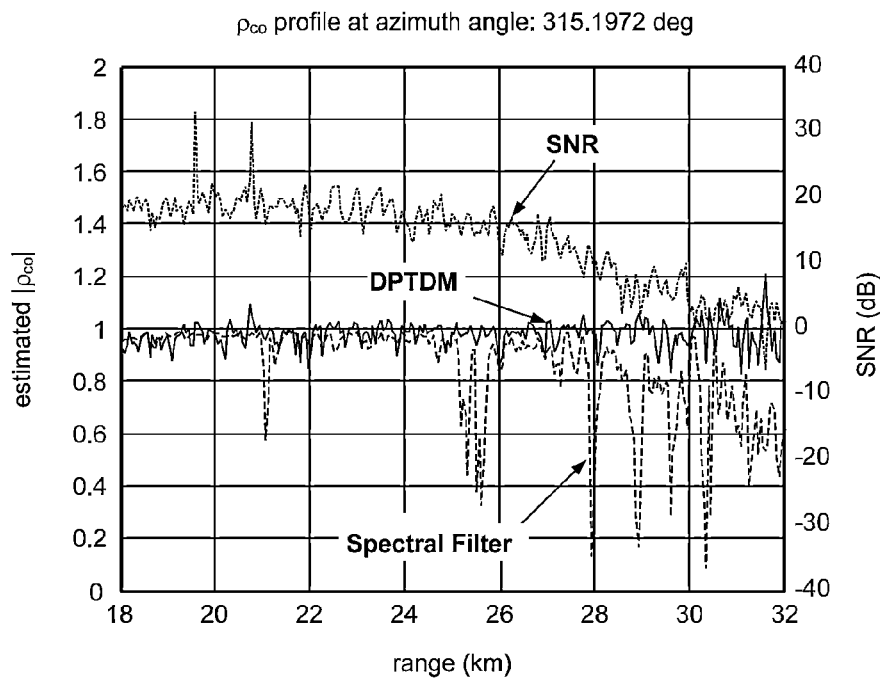

FIGS. 11A and 11B show range profiles for an estimated $|\rho_{co}|$ using both embodiments described herein and GMAP methods at azimuth angles of 275 degree and 315 degree using embodiments described herein. It is shown that GMAP $|\rho_{co}|$ is low where the signal is weak, i.e., SNR is small. Moreover, using both reflectivity and correlation coefficient thresholding, GMAP does not provide a good classification between weather echoes and clutter. In the region where clutter presents, standard deviation of GMAP $|\rho_{co}|$ is pretty high. It is explained by can be the leakage spectral points of clutter. Because some embodiments described herein operate in the time domain, these embodiments are not affected by this leakage problem. Moreover, embodiments described herein can estimate noisefloor better than GMAP does. When noise is not subtracted properly from signal, it can provide more accurate estimated $|\rho_{co}|$.

Figure 12A:
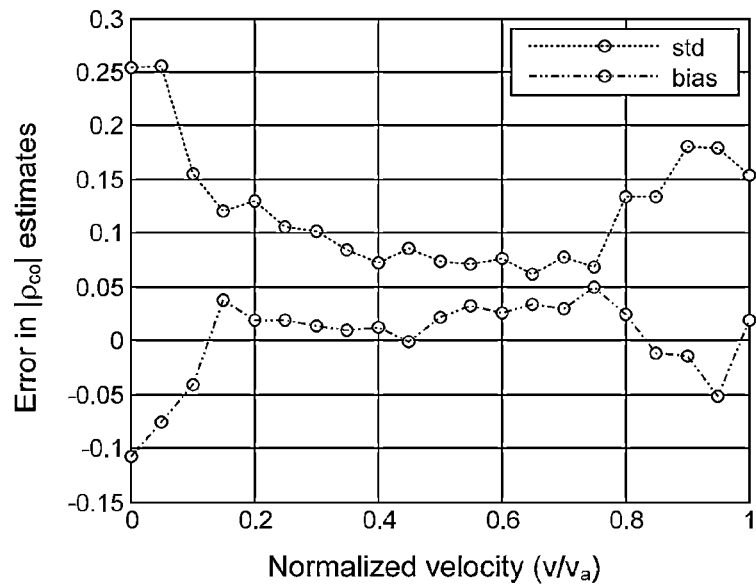
FIGS. 12A and 12B show errors in $|\rho_{co}|$ and $\phi_{dp}$ estimates using embodiments described herein.
Figure 12B:
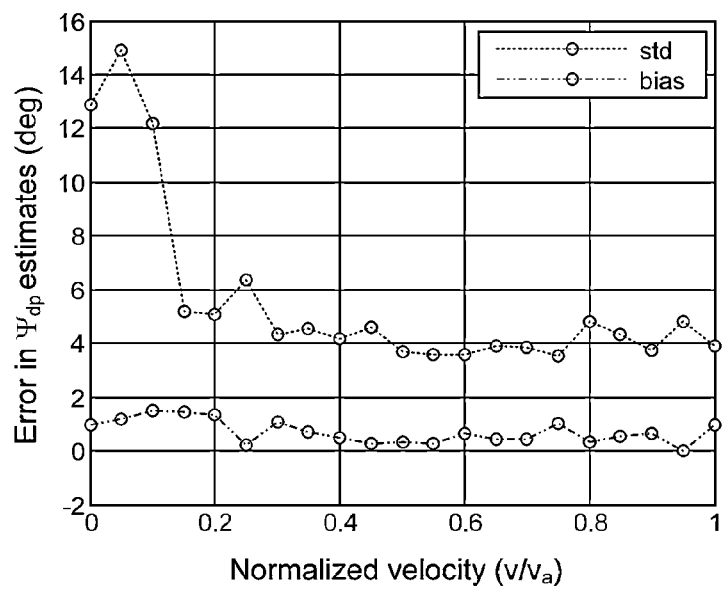

FIGS. 12A and 12B show errors in $\rho_{co}$ and $\Phi_{dp}$ estimates for only 16-sample data using embodiments described herein. As can be seen, such estimate errors is acceptable.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code, a dedicated logic circuit can be configured by suitably connecting logic gates and other circuit elements, and so on.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer-readable storage media; suitable media include magnetic disk or tape, optical storage media such as compact disk (CD) or digital versatile disk (DVD), flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A method comprising:
propagating polarized radar signals to a region of interest using a dual-polarization radar transmitter;
collecting sampled co-polar time series radar data scattered within the region of interest with the dual-polarization radar transmitter, wherein the co-polar time series radar data includes vertically polarized data and horizontally polarized data;
creating, using a computer system, a summed likelihood function by adding a likelihood function for the first time series radar data and a likelihood function for the second time series radar data;
maximizing, using the computer system, the summed likelihood function to estimate the spectral moments of the first time series radar data and the second time series radar data; and
determining, using the computer system, at least one of the differential propagation phase and the co-polar correlation coefficient between the horizontally polarized data and the vertically polarized data from a complex linear combination of the vertically polarized data and horizontally polarized data.

2. The method according to claim 1, wherein the linear combination of the horizontally polarized data and the vertically polarized data is expressed as $V_\alpha = V^H + \alpha V^V$.

3. The method according to claim 2, wherein an optimal value for $\alpha$ for the $n^{th}$ range gate measurement is estimated as $$\alpha_{opt}^{(n)} = -\frac{(\hat{Z}_{dr}^{(n)} - 1) + \sqrt{(\hat{Z}_{dr}^{(n)} - 1)^2 + 4\mathrm{Re}(\hat{\rho}_{co}^{(n-1)})\hat{Z}_{dr}^{(n)}}}{2\mathrm{Re}(\hat{\rho}_{co}^{(n-1)})\sqrt{\hat{Z}_{dr}^{(n)}}}.$$

4. The method according to claim 2, wherein an optimal value for $\alpha = j\beta$ for the $n^{th}$ range gate measurement is estimated as $$\beta_{opt}^{(n)} = -\frac{(\hat{Z}_{dr}^{(n)} - 1) + \sqrt{(\hat{Z}_{dr}^{(n)} - 1)^2 + 4\mathrm{Im}(\hat{\rho}_{co}^{(n-1)})\hat{Z}_{dr}^{(n)}}}{2\mathrm{Im}(\hat{\rho}_{co}^{(n-1)})\sqrt{\hat{Z}_{dr}^{(n)}}}.$$

5. A method of investigating a region of interest with a radar, the method comprising:
propagating polarized radar signals to the region of interest using a dual-polarization radar system;
collecting a first time series radar data scattered within the region of interest with a first polarization using a radar;
collecting a second time series radar data scattered within the region of interest with a second polarization using a radar, wherein the first polarization and the second polarization are substantially orthogonal;
creating, using a computer system, a summed likelihood function by adding a likelihood function for the first time series radar data and a likelihood function for the second time series radar data;
maximizing, using a computer system, the summed likelihood function to estimate the spectral moments of the first time series radar data and the second time series radar data; and
estimating, using a computer system, at least one of the differential propagation phase, the magnitude of the co-polar correlation coefficient, and the phase of the co-polar correlation coefficient using a linear combination of the first time series radar data and the second time series radar data.

6. The method according to claim 5, wherein at least one of the magnitude of the co-polar correlation coefficient and the phase of the co-polar correlation coefficient are estimated using the first time series radar data and the second time series radar data.

7. The method according to claim 5, wherein the linear combination of the first time series radar data and the second time series radar data comprises $$\alpha_{opt}^{(n)} = -\frac{(\hat{Z}_{dr}^{(n)} - 1) + \sqrt{(\hat{Z}_{dr}^{(n)} - 1)^2 + 4\mathrm{Re}(\hat{\rho}_{co}^{(n-1)})\hat{Z}_{dr}^{(n)}}}{2\mathrm{Re}(\hat{\rho}_{co}^{(n-1)})\sqrt{\hat{Z}_{dr}^{(n)}}}$$

and $$\beta_{opt}^{(n)} = -\frac{(\hat{Z}_{dr}^{(n)} - 1) + \sqrt{(\hat{Z}_{dr}^{(n)} - 1)^2 + 4\mathrm{Im}(\hat{\rho}_{co}^{(n-1)})\hat{Z}_{dr}^{(n)}}}{2\mathrm{Im}(\hat{\rho}_{co}^{(n-1)})\sqrt{\hat{Z}_{dr}^{(n)}}}$$

where $\alpha = j\beta$.

8. The method according to claim 5, wherein the estimating a magnitude and a phase of the co-polar correlation coefficient includes minimizing a log-likelihood function for the linear combination of the first time series radar data and the second time series radar data.

9. A radar system comprising:
a dual-polarization transmitter configured to transmit a signal in two substantially orthogonal polarizations;
a dual-polarization receiver configured to receive a first signal in first polarization and a second signal in a second polarization, wherein the first polarization and the second polarization are substantially orthogonal;

a computer system coupled at least with the dual polarization receiver, the computer system being configured to:

create a summed likelihood function by adding a likelihood function for the first signal and a likelihood function for the second signal;

maximize the summed likelihood function to estimate the spectral moments of the first signal and the second signal; and, estimate at least one of the differential propagation phase, the magnitude of the co-polar correlation coefficient, and the phase of the co-polar correlation coefficient using a linear combination of the first signal and the second signal.

10. The radar system according to claim 9, wherein the computer system is further configured to estimate at least one of the magnitude of the co-polar correlation coefficient and the phase of the co-polar correlation coefficient using the first signal and the second signal.

11. A radar system comprising:

propagation means for propagating radar into a region of interest;

receiving means for receiving radar backscatter in a first polarization state and radar back scatter in a second polarization state from the region of interest; and computation means for estimating the spectral moments of the radar backscatter in a first polarization state and the radar backscatter in a second polarization state, for minimizing a log-likelihood function of a linear combination of the radar backscatter in the first polarization state and the radar backscatter in the second polarization state, and for estimating at least one of the differential propagation phase, the magnitude of the co-polar correlation coefficient, and the phase of the co-polar correlation coefficient using the minimization of the log-likelihood function of the linear combination of the radar backscatter in the first polarization state and the radar backscatter in the second polarization state.

* * * * *